United States Patent Office 2,844,485
Patented July 22, 1958

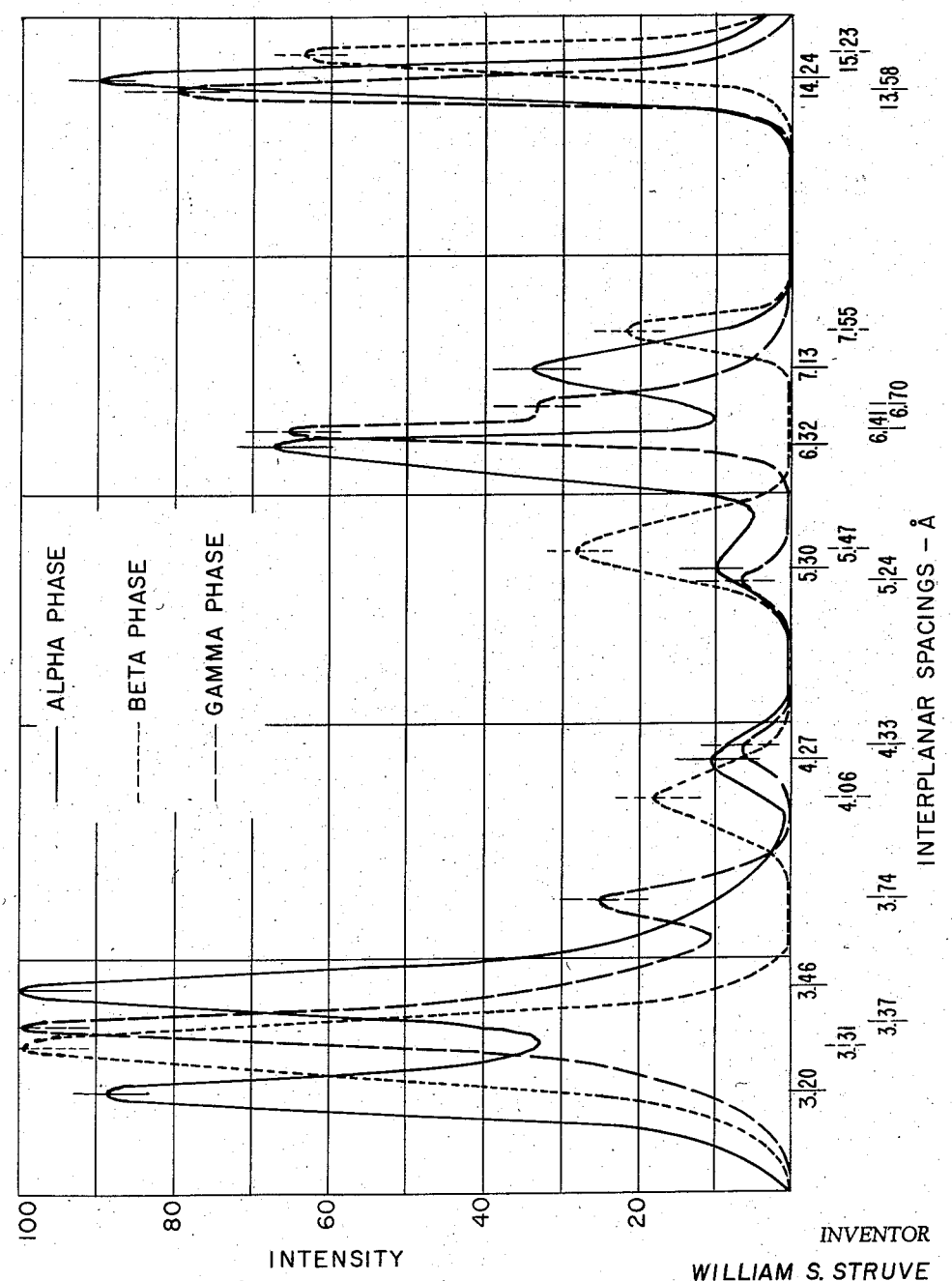

2,844,485

ORGANIC PIGMENTS

William S. Struve, Chatham, N. J., assignor to E. I. du Pont de Nemours and Company, Wilmington, Del., a corporation of Delaware Application July 22, 1955, Serial No. 523,754

10 Claims. (Cl. 106—288)

This invention pertains to quinacridone pigments.

While red pigments have been known and used for many years, there has existed a long felt need in the coating composition field for a non-bleeding red color which possesses satisfactory tinctorial strength and lightfastness as well as superior outdoor durability with respect to gloss, film integrity and bronzing. Moreover, this need has become more acute in recent years as a result of the wide acceptance of red color shades, particularly in automotive finishes.

It has now been found that linear quinacridone which is represented by the following structural formula

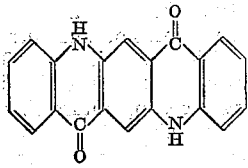

may be produced as pigments in a number of crystal phases with each phase exhibiting a different and heretofore unknown X-ray diffraction pattern. The present invention is concerned with the beta crystal phase as distinguished from the alpha and gamma crystal phases which are the respective subject matter of concurrently filed applications, Serial Nos. 523,699 and 523,755. Methods of producing quinacridone are disclosed in concurrently filed application Serial No. 523,922.

It is an object of this invention to provide a novel beta crystal phase quinacridone pigment of intense violet color and small particle size with consequent high tinting strength. It is also an object of this invention to produce color lakes from this pigment. It is a further object of this invention to provide a novel process for producing beta crystal phase quinacridone in small particle size without danger of an undesirable phase or color change occurring during the process. It is a still further object to provide a process for obtaining beta crystal phase quinacridone pigment in small particle size from quinacridones which are all or partly in a crystal phase other than the beta phase.

The objects of this invention are accomplished by milling quinacridone in any crystal phase, or in a mixture of crystal phases, with a relatively large amount of salt and also in the presence of xylene until a sample of the pigment, separated from the salt and xylene, has a surface area greater than about 60 square meters per gram (as measured by the nitrogen absorption method of Emmet described in "Advances in Colloid Science," vol. 1, 1942). The salt and xylene are separated, leaving the quinacridone in a pure beta crystal phase with suitable pigmentary properties. A particularly important and unique feature of the process is that regardless of the crystal phase of the quinacridone used as the starting material, the process converts the material to a pure beta crystal phase.

The obtaining of a beta crystal phase quinacridone end product having a surface area of above about 60 square meters per gram is critical to the use of the quinacridone as a pigment, since a surface area of less than 60 square meters per gram will not produce satisfactory results. Experience has shown that materials of this type with specific surface measurements significantly below about 60 square meters per gram have been of such low tinctorial strength as to have little commercial interest.

The accompanying Figure 1 shows the X-ray diffraction patterns of the alpha, beta and gamma crystal phases of quinacridone with the intensities adjusted so that the most intense band of each pattern is assigned a value of 100, and the patterns are then superimposed in one drawing. These X-ray patterns were obtained by the well-known powder technique using a Geiger counter to record the intensity of the diffracted rays. The instrument actually records the intensity of the diffracted ray on the vertical axis versus the angle of diffraction on the horizontal axis with CuK alpha radiation, and then this angle is converted to interplanar spacings expressed in Angstrom units. The values given are accurate to within 2%, and in most cases, variation is less than 1%. Therefore, cognizance should be taken of the variance when interpreting the specification and the claims. It is obvious that these patterns have certain similarities and this is natural because of the chemical identity of the phases. Nevertheless, there are characteristic differences.

The alpha phase in small particle size is characterized by two intense lines quite close together with interplanar spacings of 3.46 A. and 3.19 A., a third line of similar intensity with an interplanar spacing of 14.24 A., two lines of moderate intensity with interplanar spacings of 6.32 A. and 7.13 A., and two weak lines with interplanar spacings of 5.30 A. and 4.27 A. In hue, this product is a bluish red pigment of excellent strength and intensity. This phase is the easiest of the three phases to obtain.

The beta phase is characterized by five well-defined lines corresponding to interplanar spacings of 15.23 A., 7.55 A., 5.47 A., 4.06 A. and 3.31 A. The lines with interplanar spacings of 15.23 A. and 3.31 A. are characteristically much stronger than the other three. This product is a violet pigment of excellent intensity and strength, exhibiting a high degree of resistance to change under various conditions. It is a valuable pigment in its own right and also as a blending agent for use with blue pigments to obtain reddish blues.

The gamma phase is characterized by three strong lines with interplanar spacing of 13.58 A., 6.41 A., and 3.37 A. and three relatively weak lines have interplanar spacings of 5.24 A., 4.33 A. and 3.74 A. This product is a bluish red pigment of excellent strength and intensity and of outstanding resistance to change either on exposure to the elements, to solvents, or to chemical reagents.

In a preferred embodiment, quinacridone is ground in a suitable ball mill in the presence of a relatively large amount of common salt and also in the presence of about 25% by weight of xylene based on the crude pigment in the ball mill. The salt is then extracted with a hot dilute aqueous acid, during which time the xylene evaporates, leaving the quinacridone in pure beta crystal phase with excellent pigmentary properties.

The following examples are illustrative of the invention, but not in limitation thereof.

*Example 1*

6,13-dihydro-quinacridone is prepared by heating diethyl 2,5-dianilino-3,6-dihydro-terephthalate in an atmosphere of nitrogen at 250–257° C. for one hour in 4 times its weight of a mixture comprising 23.5% biphenyl and 76.5% diphenyl oxide. The dihydro-quinacridone obtained is separated by filtering and then washed with ethyl alcohol. 10 parts of the 6,13-dihydro-quinacridone and 25 parts of water are then charged to a suitable vessel equipped with an agitator and a reflux condenser. 200 parts of ethyl alcohol is then added, followed in turn by 4 parts of sodium hydroxide (as a 20% solution) and 20 parts of nitrobenzene-m-sodium sulfonate. The mixture is heated to reflux while stirring and maintained at reflux temperature for about 2 hours. After cooling the product is filtered off, washed free of alkali and dried to give 9.6 parts of quinacridone.

A ball mill of about 60 gallons total volume is charged with about 1000 lbs. of "Cyl Pebs" (cylindrical bars of iron about ½" in diameter and about 1 inch long), together with about 100 lbs. of common nails (20d size). 52 lbs. of dry sodium chloride is then added, followed by 6.0 lbs. of the crude quinacridone and finally by 1.3 lbs. of xylene. The mill is closed tightly and rotated at about 70% of critical speed for about 15 hours. The dry powder is then discharged from the mill and wet up with water and dilute sulfuric acid to a total volume of about 50 gallons with an acid concentration of about 5%. After heating to the boil and boiling for about 2 hours, the slurry is cooled by the addition of cold water, filtered and washed free of acid and sulfate ion. It may be retained as a paste or it may be dried to give a dark red pigment in substantially quantitative yield. When examined by X-ray diffraction, this product gives the typical X-ray pattern shown by the short broken lines of Figure 1 wherein there are five well-defined diffraction bands with interplanar spacings of 15.23 A., 7.55 A., 5.47 A., 4.06 A. and 3.31 A., the bands with interplanar spacings of 3.31 A. and 15.23 A. being markedly more intense than the other three. When examined for surface area by the nitrogen absorption method, it exhibits surface areas of about 60 square meters per gram and requires no texture treatments to be readily dispersible in coating composition vehicles, linoleum, vinyl plastics and the like. The color of compositions made therefrom is a very bluish red or true violet. It exhibits good color, strength and intensity and shows substantially no color change after 400 hours in a Fadeometer. Panels coated with compositions made therefrom have shown superior color stability, gloss retention and film integrity after exposure to the elements for 12 months in Florida.

The violet shade of this beta phase quinacridone makes it an especially useful pigment for blending with blue pigments such as copper phthalocyanine. There has been a great need for blue pigments of good strength and high durability, characteristic of the phthalocyanine pigments, but shaded toward the reddish side. All of the prior art red and violet pigments proposed for this use have suffered from one or more serious defects such as poor lightfastness, tendency to bleed in oil or a tendency toward clashing of the hues resulting in very dull colors. In this beta phase quinacridone, there is a bluish red to violet color which is non-bleeding, very fast to light, and of such a hue that it can be blended with phthalocyanines and similar blue pigments to give reddish shade blues of good intensity.

Example 2

6,13-dihydro-quinacridone is prepared by heating diethyl 2,5-dianilino-3,6-dihydro-terephthalate in an atmosphere of nitrogen at 250–257° C. for one hour in 4 times its weight of a mixture comprising 23.5% biphenyl and 76.5% diphenyl oxide. The dihydro-quinacridone obtained is separated by filtering and then washed with ethyl alcohol. 10 parts of the 6,13-dihydro-quinacridone and 25 parts of water are then charged to a suitable vessel equipped with an agitator and a reflux condenser. 200 parts of ethyl alcohol is then added, followed in turn by 4 parts of sodium hydroxide (as a 20% solution) and 20 parts of nitrobenzene-m-sodium sulfonate. The mixture is heated to reflux while stirring and maintained at reflux temperature for about 2 hours. After cooling the product is filtered off, washed free of alkali and dried to give 9.6 parts of quinacridone.

15 parts of this quinacridone is charged to a suitable flask protected from the atmospheric moisture with a drying tube together with 15 parts of anhydrous aluminum chloride and about 120 parts of nitrobenzene. While stirring well, the mixture is heated to about 110° C. and held at that temperature for about two hours. 0.6 part of stearic acid is then added and the mixture is drowned in about 2000 parts of cold water. After adding about 20 parts of caustic soda, the nitrobenzene is removed by steam distillation, and the pigment is separated from the mother liquor by filtering and washing alkali free. It is then reslurried in a 4.5% solution of sulfuric acid, heated to the boil for about one-half hour, filtered, washed free of soluble salts and dried at about 60° C. to give a very bluish shade quinacridone pigment which is in the beta crystal phase. A mixture of 23.5% biphenyl and 76.5% diphenyl oxide, and also tetramethylene sulfone have been used in place of the nitrobenzene in this process to give products in the beta crystal phase.

Example 3.—Rosinated lake of beta phase quinacridone 2600 parts of quinacridone paste from Example 1 (500 parts dry beta phase quinacridone) is slurried with water to make a total volume equivalent to about 3000 parts, and the temperature is adjusted to about 50° C. In a separate container, 200 parts of hydrogenated rosin is dissolved in a solution of 27 parts sodium hydroxide in 1500 parts of water at the boil, and this solution is added to the quinacridone suspension and stirred well. A solution of 65 parts calcium chloride in 1000 parts of water is then added slowly, and the slurry is stirred for 30 minutes while keeping the temperature in the range of 50–60° C. The resulting pigment is then isolated by filtering, washing free of soluble salts and drying to give about 710 parts of a brilliant violet colored pigment containing about 70% beta phase quinacridone and 30% of the calcium salt of hydrogenated rosin. This product exhibits superior dispersion properties in many vehicles.

The lakes may contain 50 to 80% color by weight and a preferred amount is 70%. Such rosinate lakes may be made from various grades of rosin dissolved in any convenient alkali and precipitated with an alkaline earth or a heavy metal salt. Barium, calcium, magnesium, aluminum and zinc salts are suitable for forming the insoluble rosinate. Hydrogenated rosin is especially suitable for forming the lakes because of its relative purity and light color; furthermore, it is a saturated molecule, and there is no problem of spontaneous oxidation and consequent fire hazard. With hydrogenated rosin, calcium is the preferred precipitant because it gives a solid precipitate in contrast to some metals which give soft oily precipitates. The particular salt of calcium used is dictated by economy and availability. Thus, calcium nitrate or calcium acetate would be equally effective.

The amount of xylene is somewhat critical though the effect is present over a fairly wide range. The preferred amount is between about 20% and 25% based on the weight of the pigment in the mill. If the amount of xylene is reduced below about 15% there is a tendency for incomplete phase conversion and below about 10% it is completely ineffective. Increasing the amount above about 30% offers no advantage and the upper limit is that point where the milled mass begins to coalesce and have the appearance of wetness. Although xylene is the preferred liquid, other aromatic hydrocarbons and similar non-polar liquids, such as benzene and toluene, may be used as well as their halogenated derivatives such as ortho dichlorbenzene.

Any mill which grinds by shearing and attrition is suitable, e. g., a roller mill or an edge-runner mill or a ball mill which is the preferred apparatus. The optimum conditions for milling are not at all critical. The combination of "Cyl Pebs" and nails, as used in the above examples, is a convenient means of avoiding caking in a ball milling operation, but conventional balls of various sizes may be used with satisfactory results. Mill loading is conventional. The optimum time will vary with the size of the mill, and it is easily determined by the skilled operator for any given mill.

The ratio of about 9 parts salt to 1 part pigment has proved to be a good ratio for satisfactory results, but it may be varied widely from as little as about 4 parts of salt up to 15–20 parts with only minor influence on the results. The lower amounts require longer mill cycles while the large amounts offer no advantage and are thus quite uneconomical.

The type of salt used in this process may also be varied. Sodium chloride is preferred because of low cost and ready availability but other salts soluble in water or dilute acid such as potassium chloride, anhydrous sodium sulfate, ammonium chloride, ammonium sulfate, and calcium carbonate may be used with equally good results. Powdered commercial grades of these salts are most conveniently used. The extraction after ball-milling is necessary to remove the salt used as the grinding aid, and the presence of acid insures the removal of any particles of metal which may be abraded from the mill on the grinding balls.

The bluish red to violet beta phase quinacridone is a very durable and very stable pigment which fills a long felt need for a durable, stable, non-bleeding pigment in this shade range. It has special utility for uses where it may be exposed to the elements, especially light, and where stability to chemical agents and solvents are required. Thus it is a valuable pigment for use in automotive finishes where it is valuable in its own right as a violet, and it is equally useful in blending to give reddish blue shades. It is also useful in coloring linoleum, vinyl plastics, rubber, and is very valuable for outdoor posters.

I claim:

1. A new bluish red to violet pigment comprising linear quinacridone in the beta crystal phase characterized by an X-ray diffraction pattern exhibiting two strong lines corresponding to interplanar spacings of 3.31 A. and 15.23 A. and exhibiting three other lines of lesser intensity corresponding to interplanar spacings of 7.55 A., 5.47 A. and 4.06 A., said beta crystal phase quinacridone having a surface area of at least 60 square meters per gram.

2. A process for preparing a beta crystal phase linear quinacridone pigment characterized by an X-ray diffraction pattern exhibiting two strong lines corresponding to interplanar spacings of 3.31 A. and 5.23 A. and exhibiting three other lines of lesser intensity corresponding to interplanar spacings of 7.55 A., 5.47 A. and 4.06 A., which comprises milling linear quinacridone in the presence of an inorganic salt and an aromatic liquid until the beta crystal phase is obtained and until the surface area of the pigment is at least 60 square meters per gram, said liquid being selected from the group consisting of liquid aromatic hydrocarbons and liquid halogenated aromatic hydrocarbons and present in an amount ranging from about 10% by weight of the quinacridone to an amount at which the grinding mass begins to coalesce, separating said salt and said liquid, and recovering beta crystal phase linear quinacridone pigment.

3. A process for preparing a beta crystal phase linear quinacridone pigment characterized by an X-ray diffraction pattern exhibiting two strong lines corresponding to interplanar spacings of 3.31 A. and 5.23 A. and exhibiting three other lines of lesser intensity corresponding to interplanar spacings of 7.55 A., 5.47 A. and 4.06 A., which comprises milling linear quinacridone in the presence of an inorganic salt and an aromatic liquid until the beta crystal phase is obtained and until the surface area of the pigment is at least 60 square meters per gram, said liquid being selected from the group consisting of liquid aromatic hydrocarbons and liquid halogenated aromatic hydrocarbons and present in an amount ranging from about 10% by weight of the quinacridone to an amount at which the grinding mass begins to coalesce, said salt being present in an amount which is at least four times the weight of the quinacridone, separating said salt and said liquid, and recovering beta crystal phase linear quinacridone pigment.

4. A process for preparing a beta crystal phase linear quinacridone pigment characterized by an X-ray diffraction pattern exhibiting two strong lines corresponding to interplanar spacings of 3.31 A. and 5.23 A. and exhibiting three other lines of lesser intensity corresponding to interplanar spacings of 7.55 A., 5.47 A. and 4.06 A., which comprises milling linear quinacridone in the presence of an inorganic salt and an aromatic liquid until the beta crystal phase is obtained and until the surface area of the pigment is at least 60 square meters per gram, said liquid being selected from the group consisting of liquid aromatic hydrocarbons and liquid halogenated aromatic hydrocarbons and present in an amount which is about 25% by weight of the quinacridone, said salt being present in an amount which is at least nine times the weight of the quinacridone, and recovering beta crystal phase linear quinacridone pigment.

5. The process of claim 2 in which the liquid aromatic hydrocarbon is xylene.

6. The process of claim 5 in which the inorganic salt is sodium chloride.

7. The process of claim 3 in which the liquid aromatic hydrocarbon is xylene.

8. The process of claim 7 in which the inorganic salt is sodium chloride.

9. The process of claim 4 in which the liquid aromatic hydrocarbon is xylene.

10. The process of claim 4 in which the inorganic salt is sodium chloride.

References Cited in the file of this patent

UNITED STATES PATENTS

| | | |
|---|---|---|
| 2,013,090 | Erskene et al. | Sept. 3, 1935 |
| 2,054,100 | Scott et al. | Sept. 15, 1936 |
| 2,378,283 | Bucher | June 12, 1945 |
| 2,402,167 | Lang | June 18, 1946 |
| 2,453,490 | Callaway et al. | Nov. 9, 1948 |
| 2,601,668 | Tullsen | June 24, 1952 |
| 2,687,410 | Hanke | Aug. 24, 1954 |

OTHER REFERENCES

Liebermann et al.: Annalen, vol. 518, pages 245–259 (1935).

UNITED STATES PATENT OFFICE
CERTIFICATE OF CORRECTION

Patent No. 2,844,485

July 22, 1958

William S. Struve

It is hereby certified that error appears in the printed specification of the above numbered patent requiring correction and that the said Letters Patent should read as corrected below.

Column 5, line 52, and column 6, lines 4 and 23, for "5.23 A.", each occurrence, read -- 15.23 A. --.

Signed and sealed this 18th day of November 1958.

(SEAL)
Attest:
KARL H. AXLINE
Attesting Officer

ROBERT C. WATSON
Commissioner of Patents